United States Patent [19]
Chasteen

[11] Patent Number: 5,377,646
[45] Date of Patent: Jan. 3, 1995

[54] LIQUID PETROLEUM GAS FUEL DELIVERY SYSTEMS

[75] Inventor: Ronald E. Chasteen, Washington, Mo.

[73] Assignee: Pacer Industries, Inc., Washington, Mo.

[21] Appl. No.: 119,956

[22] Filed: Sep. 10, 1993

[51] Int. Cl.⁶ ............................................. F02M 21/04
[52] U.S. Cl. ...................................... 123/527; 48/144
[58] Field of Search .......... 123/525, 526, 527, 27 GE, 123/3; 48/144

[56] References Cited

U.S. PATENT DOCUMENTS

| | | | |
|---|---|---|---|
| 3,664,315 | 5/1972 | Kramer | 123/527 |
| 4,494,515 | 1/1985 | Brown | 123/527 |
| 4,813,394 | 3/1989 | St. Clair | 123/27 GE |
| 4,843,558 | 6/1989 | Bergmann | 123/527 |
| 5,251,602 | 10/1993 | Kurihara | 123/527 |

FOREIGN PATENT DOCUMENTS

| | | | |
|---|---|---|---|
| 0247044 | 12/1985 | Japan | 123/527 |
| 1451316 | 1/1989 | U.S.S.R. | 123/525 |

Primary Examiner—Raymond A. Nelli
Assistant Examiner—Erick Solis
Attorney, Agent, or Firm—Richard W. Hanes

[57] ABSTRACT

A gaseous fuel management system for an internal combustion engine having a source of gaseous fuel such as LPG or CNG, a throttle control and an exhaust system and having an air intake tube for conducting combustion air into the manifold of the engine and an angularly movable butterfly valve disposed in the air intake tube, responsive to the operation of the throttle control. A fuel delivery bar having an interior longitudinal fuel conducting bore is diametrically disposed in the air intake tube upstream from the butterfly valve and has a plurality of fuel delivery orifices in its downstream facing side which orifices communicate with the interior of the bar. A fuel lane interconnects the interior bore of the fuel delivery bar to the fuel source and an electronically controlled valve meters the amount of fuel admitted to the interior bore of the fuel delivery bar as a function of the oxygen content of the products of combustion in the exhaust system.

9 Claims, 2 Drawing Sheets

LIQUID PETROLEUM GAS FUEL DELIVERY SYSTEMS

The present invention relates to a fuel management system for internal combustion engines and particularly to such a system for use with liquid petroleum gas (LPG or Propane) or compressed natural gas (CNG) as the fuel.

BACKGROUND

Delivery of gaseous fuels such as LPG or CNG to internal combustion engines presents a whole different set of problems than those encountered with liquid fuels, such as gasoline. For one thing, gaseous fuels are of different densities than the air with which they are to mixed to form a combustible mixture, causing the gaseous fuel to stratify and remain in boundary layers, separated from the air along the intake track. The stratification leaves clusters of fuel molecules which can be only partially burned, resulting in a loss of potential power from the engine, excessive fuel consumption and excess hydrocarbons and other undesirable pollutants to be present in the exhaust.

Furthermore, to achieve an energy or BTU output similar to that of gasoline, a significantly greater volume of the gaseous fuel is required, such as for example, two to three times more. Dealing with greater volumes of fuel further increases the difficulty of achieving a proper mixing of the fuel and the air, thus increasing the probability of undesirable exhaust emissions.

Mixing devices for mixing gaseous fuels and air are known, but most of such devices merely substitute a mixing chamber having a throttle controlled butterfly valve for the conventional carburetor in a liquid fuel type of engine. Such a device with upstream fuel delivery is described in U.S. Pat. No. 4,765,303. Contrary to the present invention, where the pressure drop across a diametrically disposed fuel delivery. bar is primarily responsible for creating the fuel flow into the air intake tube, the '303 device depends upon throttling a fuel valve in response to negative pressure signals from a Venturi in the main fuel/air stream.

U.S. Pat. No. 4,370,969 discloses a propane gas feed system wherein controlled and measured quantities of gas are pre-mixed with air and then fed to a carburetor. An air cut off screen is used to control the air/fuel ratio relative to a changeover from propane to gasoline.

In U.S. Pat. No. 4,632,083 a control unit senses operating pressures along the intake pipe system in the injection zone and in the zone downstream of the throttle valve in order to control an expander unit which feeds the gaseous fuel to a volumetric measuring device at a pressure equal to the sum of the absolute values of the two pressures at the pressure measuring points.

U.S. Pat. No. 4,526,155 discloses a pressure regulating system for preparing the mixture of gas and air for an internal combustion engine.

In other gaseous fuel management devices, for a particular engine icad requirement, gaseous fuel is drawn into the mixing chamber through a fuel valve which is responsive to the engine intake manifold pressure being sensed by a spring loaded diaphragm. One such arrangement is disclosed in U.S. Pat. No. 4,694,811. In some devices, a separate air valve is also supplied in an effort to achieve the correct fuel-air mixture for best combustion results and lowest undesirable emissions. Such a device is shown in U.S. Pat. No. 2,311,315.

One of the significant problems with arrangements which depend upon the suction created by the intake manifold pressure for establishing fuel flow and fuel control is the exacerbation of the exhaust emissions problem during the period immediately following a quick closing of the throttle valve for deceleration. When the throttle valve is suddenly closed, or its opening is substantially reduced, the air flow into the intake manifold is abruptly reduced, creating a high vacuum in the manifold which continues to suck or induce the delivery of higher levels of fuel than is required for the reduced amount of air being admitted into the intake manifold with the reduced throttle opening. The resultant excessively rich mixture is not completely burned and highly undesirable exhaust emissions are produced.

It is thus the primary object of the present invention to provide apparatus for improved blending of air and gaseous fuels prior to introduction of the mixture to the combustion chambers of an internal combustion engine so as to reduce fuel consumption and give superior power performance.

A further object of the invention is to increase combustion efficiency in a gaseous fuel internal combustion engine and significantly decrease carbon monoxide emissions therefrom.

Another object of the invention is to provide gaseous fuel/air mixing apparatus which will be efficient enough to permit the internal combustion engine to operate on less fuel than is the case with prior art gaseous fuel engines.

A still further object of the invention is to provide fuel management apparatus which is immediately responsive to deceleration throttle commands and will not provide excessively rich fuel/air ratios and excessive emissions in the period of time immediately following a quick closing of the throttle.

Other and still further objects, features and advantages of the invention will become apparent from a reading of the following detailed description of a preferred form of the invention taken in conjunction with the accompanying drawings.

SUMMARY OF THE INVENTION

Figure 1:
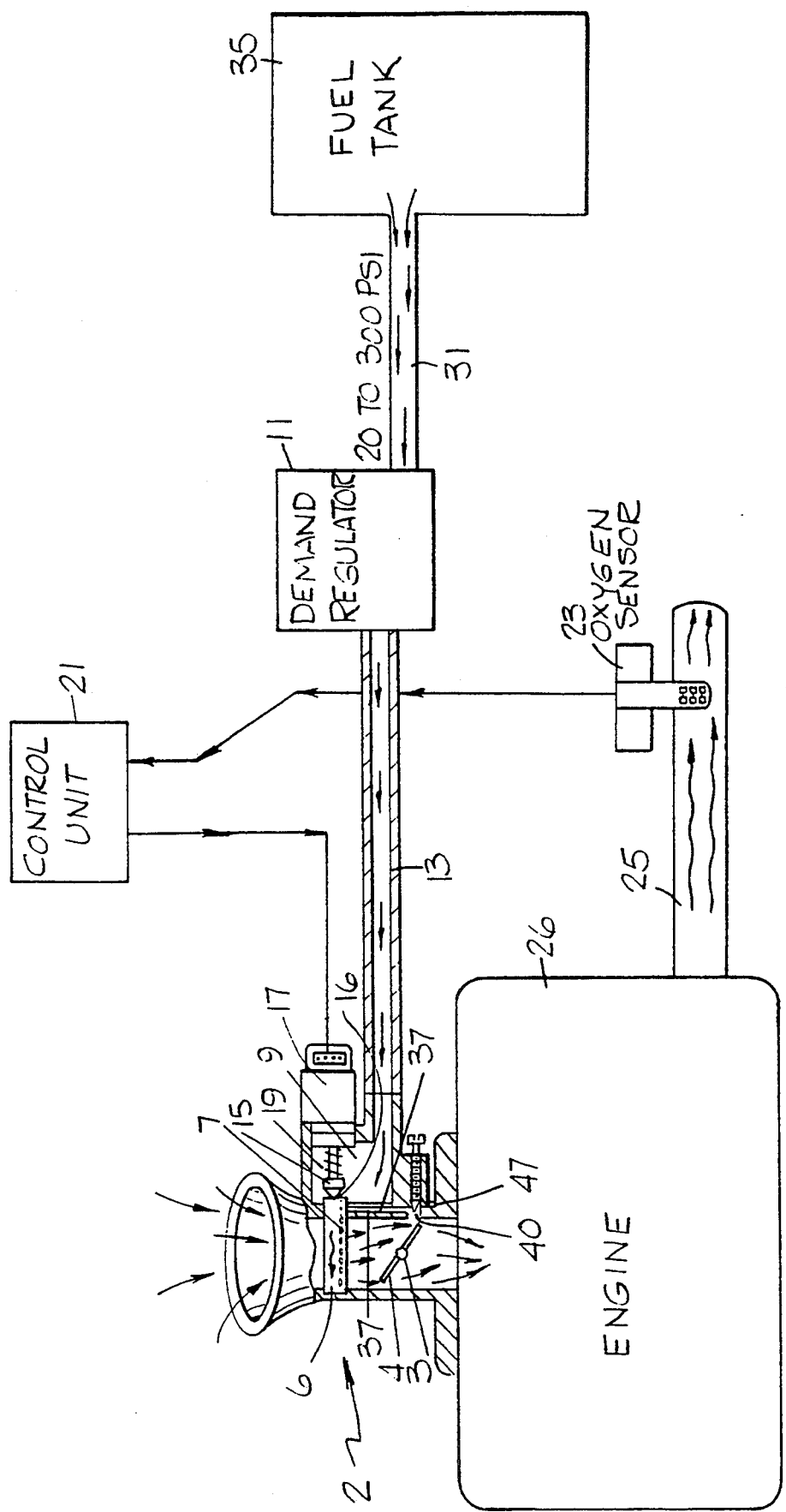
FIG. 1 is a diagrammatic cross sectional view of the fuel/air mixing tube of the present invention, shown together with a diagrammatic view of the exhaust pipe and the valve control unit illustrated in block diagram form.

The apparatus of the present invention is intended to provide a continuously efficient fuel air mixture to an internal combustion engine which uses gaseous fuels and to eliminate the traditional excessively rich mixture and resultant unburned fuel which occurs after rapid deceleration of engine speed. The device includes an air conducting tube which is open on its intake end to ambient air and which directs the air into the intake manifold of an internal combustion engine. Intermediate the intake port of the air tube and its juncture with the intake manifold, a rotatable butterfly valve is positioned to control the amount of air flow through the tube in a manner well known to the internal combustion engine art. Upstream of the butterfly valve and diametrically positioned across the throat of the air tube is a hollow fuel delivery bar which is provided with a plurality of generally downstream facing orifices through which the fuel is drawn into the air which is being conducted through the tube and across the fuel delivery bar. The pressure drop created by the air moving across the bar is primarily responsible for drawing fuel from a fuel source into the interior of the bar for delivery into the air stream, however an electronically controlled metering valve positioned at the mouth of the fuel delivery bar provides the fine tuning control of the amount of fuel being admitted into the delivery bar. The metering valve is response to a control unit which receives its informational input from an oxygen sensor located in the engine exhaust stream, thus providing a closed feedback loop to properly control the fuel flow to provide a mixture that is commensurate with the stoichiometric air/fuel ratio for the given fuel.

The fuel delivery bar is positioned upstream of the butterfly valve so that when the butterfly valve is closed during sudden decelerations of the engine, the intake manifold will be isolated from the fuel delivery bar and the low pressure present in the manifold will not be felt by the delivery bar, thus preventing excessive fuel delivery to overly enrich the fuel/air mixture.

DETAILED DESCRIPTION OF THE INVENTION

A tubular throttle body 2 contains a rotatable butterfly type of throttle valve 4 whose axis of rotation 3 is positioned diametrically across the substantially cylindrical lower portion of the throttle body 2. The throttle valve is connected to a throttle lever (not shown) or similar actuation device in a well known manner.

Upstream from the throttle valve, relative to the air flow through the tubular throttle body, is a cylindrical fuel delivery bar 6, disposed diametrically across the body's opening and having an upstream facing side and a downstream facing side. The bar 6 is hollow and is provided with a plurality of apertures 7 which communicate with the interior bore of the bar 6. Several different arrangements of the apertures are possible as long as the pattern results in a diffusion of the gaseous fuel over the whole length of the fuel delivery bar 6. Spacing a plurality of fuel ports or orifices 7 in the downstream facing side of the bar 6 along three parallel longitudinal lines, where the two outer lines are spaced 60 radial degrees from the center one of the three lines, has been found effective to accomplish the fuel/air mixing purposes of the present invention. The middle one of the lines of apertures 7 is located at the center of the downstream facing side of the tube 6.

Reduced air pressure on the downstream facing side of the fuel delivery bar 6, caused by air flowing over and around the cylindrical body of the bar, draws gaseous fuel through the apertures 7 from the interior of the fuel bar while the turbulence of the air swirling around the outside of the bar mixes the gaseous fuel with the incoming air.

The intake end of the fuel delivery bar passes through the side wall of the throttle body 2 and into a chamber 9 whose interior communicates with the outprint of a fuel demand regulator 11, by a fuel line 13. The low pressure across the fuel delivery tube 6 and in the chamber 9, which is created by the air passing over the tube and around the apertures 7, draws fuel from the regulator 11 through the fuel line 13 and into the chamber 9, there to be metered into the end orifice of the fuel delivery bar 6 by an adjustable valve cone 15 which cooperates with a valve seat 16 formed by the perimeter of the bar. Adjustment of the cone is accomplished by moving the cone back and forth along the extended longitudinal axis of the bar 6 to decrease or enlarge the space between the valve cone 15 and the valve seat 16 at the end of the bar. The adjusting movement can be accomplished by a number of different means well known to the art, such as with a stepper motor 17 attached to the valve stem 19 carrying the valve cone 15. The stepper motor, or an alternative electronic valve, is controlled by the electrical output of a control unit 21 which receives its input from an oxygen sensor 23 located in the exhaust manifold 25 of the internal combustion engine 26. The engine 26, the exhaust manifold 25, the control unit 21 and the fuel air mixing system already described define a closed loop feed back system which leans the fuel/air mixture upon an indication from the oxygen sensor 23 that the mixture is too rich for complete combustion of the fuel. Conversely, the fuel valve will be adjusted to increase the amount of fuel when the oxygen sensor detects that the mixture is too lean. The demand regulator 11 is attached by a fuel line 31 to a fuel holding tank 35.

Figure 2:
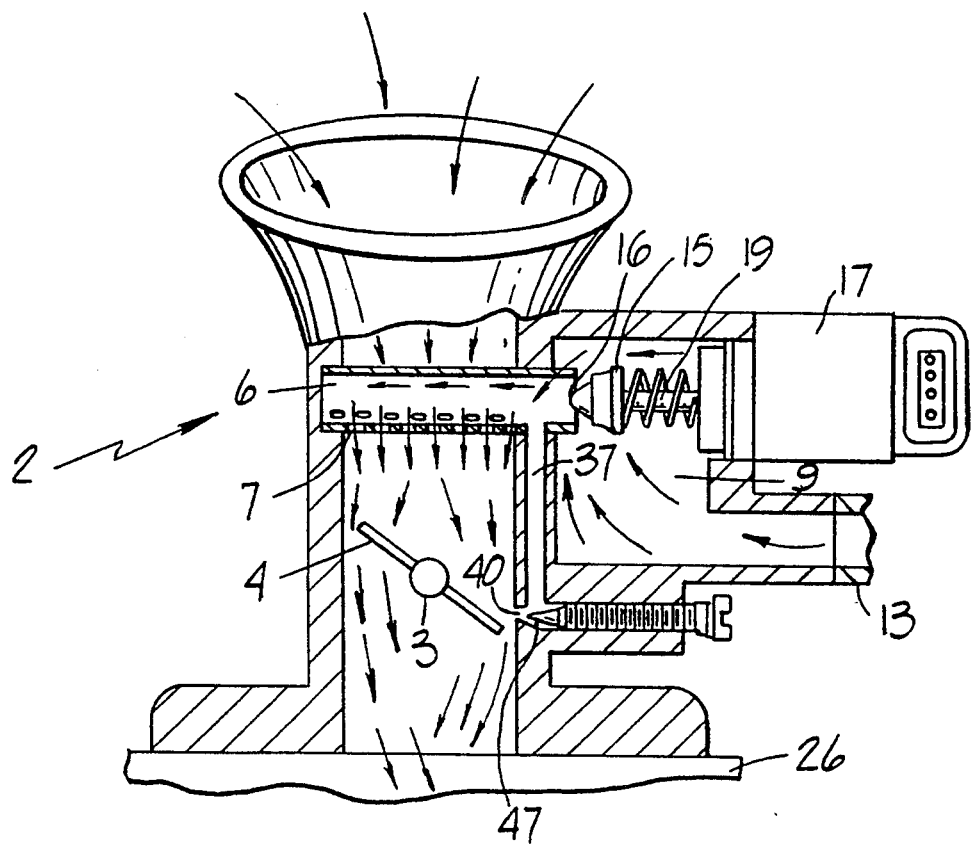
FIG. 2 is an enlarged cross sectional view of the air intake tube assembly showing the butterfly valve, the fuel metering bar, the idle fuel control and the step motor and associated fuel valve.
Figure 3:
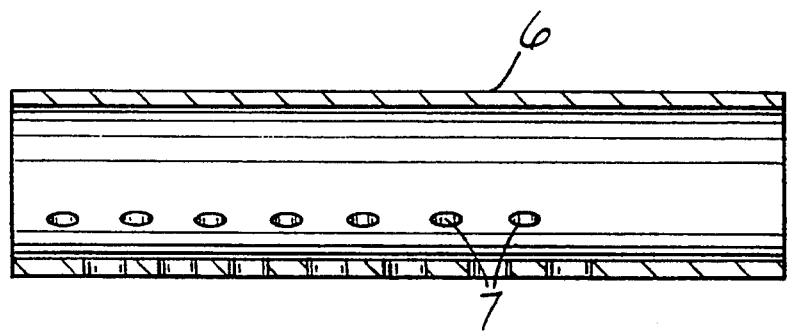
FIG. 3 is an enlarged longitudinal cross sectional view of the fuel bar.
Figure 4:
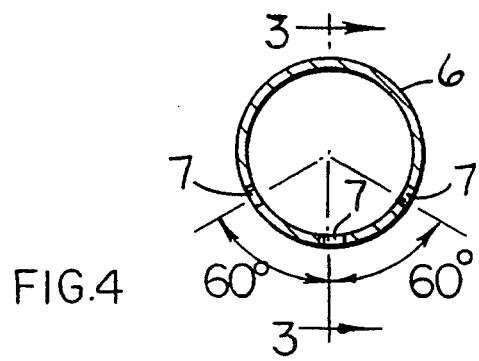
FIG. 4 is a cross sectional view of the fuel bar taken along lines 4—4 of FIG. 3.

Because engine idle conditions present special fuel/air considerations, an independent idle fuel adjustment is provided. In the preferred embodiment, an idle fuel conduit 37 depends from and one end of which is in fluid communication with the interior of the fuel delivery bar 6 through an aperture 39. The other end of the idle fuel conduit 37 communicates with the interior of the air intake tube 2 through a port 40 in the side of the tube 2 at a level just below the axis 3 of the throttle valve. The orifice size of the port 40 can be fixed or can be regulated by adjustment of an idle mixture needle valve 47 whose needle end is proximate to and inserts into the port 40. Whether fixed or variable, the idle fuel flow is grossly controlled by the effective size of the port 40 and is or can be fine tuned or "trimmed" by the adjustments of fuel flow into the fuel bar 6 taking place through the stepping motor's variation of the position of the valve cone 15 with respect to the valve seat 16. While in many cases this "trimming" feature, based upon the feedback from the oxygen sensor 23, is desirable for idle conditions, it is not necessary for a properly functioning idle fuel flow control. The upper end of the conduit 37, which is shown in the drawings to be in communication with the interior of the delivery bar 6 through the aperture 39 may be routed directly into the chamber 9, bypassing the control valve which is operated by the stepping motor 17, as shown by the dotted lines in FIG. 2 representing the alternative by-pass idle fuel flow conduit 36.

In addition to providing idle fuel flow, the configuration of the idle fuel conduit 37 or 36 and the port 40 in respect to the positions of the fuel delivery bar 6 and the butterfly valve 4 contribute to the stated objective of leaning the fuel/air mixture upon a hard or sudden deceleration. During such a deceleration the idle port 40 is referenced to the low pressure (or high vacuum) of the intake manifold. Assuming that a hard deceleration closes the butterfly valve 4, the pressure above the butterfly will be atmospheric, while the pressure below the butterfly valve in the vicinity of the port 40 will be substantially less than atmospheric. This pressure differential creates air flow from that portion of the air tube 2 which is above the butterfly valve through the apertures 7 into the delivery tube 6 and into the idle fuel flow conduit 37 or 36, emerging from the port 40 into that portion of the air tube below the butterfly valve 4. This increased air flow into the air tube below the butterfly valve acts to further lean the fuel/air mixture during deceleration, even accepting the fact that some fuel will also flow through the idle fuel port 40 as a result of the low pressure being felt at the port 40.

Having described the various components of the gaseous fuel delivery system it will be seen that when the throttle valve is suddenly closed the air flow in the air intake tube will simultaneously be reduced and the fuel delivered into that air flow will also be proportionately limited, avoiding the rich mixture surge which accompanies the type of fuel delivery system where the fuel delivery orifices are downstream of the throttle valve.

I claim:

1. A gaseous fuel management system for an internal combustion engine having a throttle control and an exhaust system comprising;
    an air intake tube for conducting combustion air into the engine,
    an angularly movable butterfly valve disposed in the air intake tube and responsive in its angular movements to the throttle control, and
    a fuel delivery bar having an interior longitudinal fuel conducting bore diametrically disposed in the air intake tube upstream from the butterfly valve and having an upstream facing side and a downstream facing side and having a plurality of fuel delivery orifices in its downstream facing side which communicate with the said interior bore.

2. The combination of claim 1 and further including;
    a fuel source,
    means interconnecting the fuel conducting bore of the fuel delivery bar to the fuel source, including valve means.

3. The combination of claim 2 and further including,
    control means connected to the valve means for controlling the amount of fuel admitted to the interior bore of the fuel delivery bar.

4. The combination of claim 3 where the control means includes an oxygen sensor disposed in the exhaust system for determining the amount of oxygen in the exhaust gas.

5. The combination of claim 4 where the means interconnecting the fuel delivery bar to the fuel source includes a chamber in communication with the bore of the fuel delivery bar and into which bore fuel is drawn by the pressure drop across the fuel delivery bar which pressure drop is produced by the air flow in the air intake tube.

6. The combination of claim 4 and further including,
    an idle fuel flow conducting conduit having first and second end openings where the said first end opening is in communication with the fuel source,
    an idle mixture fuel input port disposed in the side of the air intake tube downstream of the butterfly valve and in communication with the said second end opening of the idle fuel conducting conduit.

7. The combination of claim 6 and further including an idle mixture control valve disposed in the idle mixture input port for regulating the amount of fuel passing through the input port.

8. The combination of claim 4 and further including,
    an idle fuel flow conducting conduit having first and second end openings where the said first end opening is in communication with the interior of the fuel delivery bar,
    an idle mixture fuel input port disposed in the side of the air intake tribe downstream of the butterfly valve and in communication with the said second end opening of the idle fuel conducting conduit.

9. The combination of claim 8 and further including an idle mixture control valve disposed in the idle mixture input port for regulating the amount of fuel passing through the input port.

* * * * *